United States Patent
Lection et al.

(10) Patent No.: US 10,331,110 B2
(45) Date of Patent: Jun. 25, 2019

(54) METHODS AND SYSTEMS FOR VERIFYING AND MODIFYING A 3D PRINTING PROCESS

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 15/251,292

(22) Filed: Aug. 30, 2016

(65) Prior Publication Data

US 2018/0059644 A1    Mar. 1, 2018

(51) Int. Cl.
| G05B 19/4099 | (2006.01) |
| B29C 67/00 | (2017.01) |
| B33Y 50/00 | (2015.01) |
| H04N 1/00 | (2006.01) |
| B29C 64/386 | (2017.01) |

(52) U.S. Cl.
CPC ........ *G05B 19/4099* (2013.01); *B29C 64/386* (2017.08); *B33Y 50/00* (2014.12); *H04N 1/00827* (2013.01); *G05B 2219/35134* (2013.01); *G05B 2219/49007* (2013.01); *Y02P 90/265* (2015.11)

(58) Field of Classification Search
None
See application file for complete search history.

(56) References Cited

U.S. PATENT DOCUMENTS

| 6,211,848 | B1 | 4/2001 | Plesniak et al. |
| 8,847,953 | B1* | 9/2014 | Cho ............... B29C 67/0051 |
| | | | 345/419 |
| 9,108,358 | B1 | 8/2015 | Herloski et al. |
| 2004/0173946 | A1 | 9/2004 | Pfeifer et al. |
| 2014/0039663 | A1* | 2/2014 | Boyer ............... B33Y 10/00 |
| | | | 700/118 |
| 2015/0177158 | A1 | 6/2015 | Cheverton |
| 2015/0213645 | A1* | 7/2015 | Siebarth ............ G06T 19/00 |
| | | | 345/420 |
| 2016/0096331 | A1* | 4/2016 | Linnell ............. B29C 64/241 |
| | | | 264/494 |
| 2016/0098824 | A1 | 4/2016 | Fry et al. |
| 2016/0282813 | A1* | 9/2016 | Urbach ............ G03H 1/0476 |
| 2017/0090460 | A1* | 3/2017 | Andrew ............ B33Y 50/02 |
| 2018/0224926 | A1* | 8/2018 | Harviainen ....... G06F 3/0488 |

FOREIGN PATENT DOCUMENTS

WO    2015053644 A2    4/2015

* cited by examiner

*Primary Examiner* — Umut Onat
(74) *Attorney, Agent, or Firm* — Griffiths & Seaton PLLC

(57) ABSTRACT

Embodiments for 3D printing an object by a processor are described. During a 3D printing process to form a 3D printed objected, a partially completed 3D printed object formed by the 3D printing process is scanned. A shape of the partially completed 3D printed object is determined based on scanning of the partially completed 3D printed object. A holographic object is caused to be generated based on the determined shape of the partially completed 3D printed object.

21 Claims, 9 Drawing Sheets

METHODS AND SYSTEMS FOR VERIFYING AND MODIFYING A 3D PRINTING PROCESS

BACKGROUND OF THE INVENTION

Field of the Invention

The present invention relates in general to computing systems, and more particularly, to various embodiments for verifying and modifying a 3D printed object and/or a 3D printing process used to form a 3D printed object.

Description of the Related Art 3D printing is a relatively new process of making solid, three dimensional objects from a digital file. 3D printing processes typically create the object using an additive process in which successive layers of material are laid down or deposited until an object with the desired size and shape is formed. Each of these layers may be considered to be a very thin horizontal cross-sectional "slice" of the end product.

As 3D printing becomes more common, there is a need to provide the user with real-time updates of the current status of the printed object, as well as to give the user the ability to check for quality control issues and make any appropriate corrections when desired.

SUMMARY OF THE INVENTION

Various embodiments for 3D printing an objet by a processor are described. In one embodiment, by way of example only, a method for 3D printing an object, again by a processor, is provided. During a 3D printing process to form a 3D printed objected, a partially completed 3D printed object formed by the 3D printing process is scanned. A shape of the partially completed 3D printed object is determined based on scanning of the partially completed 3D printed object. A holographic object is caused to be generated based on the determined shape of the partially completed 3D printed object.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
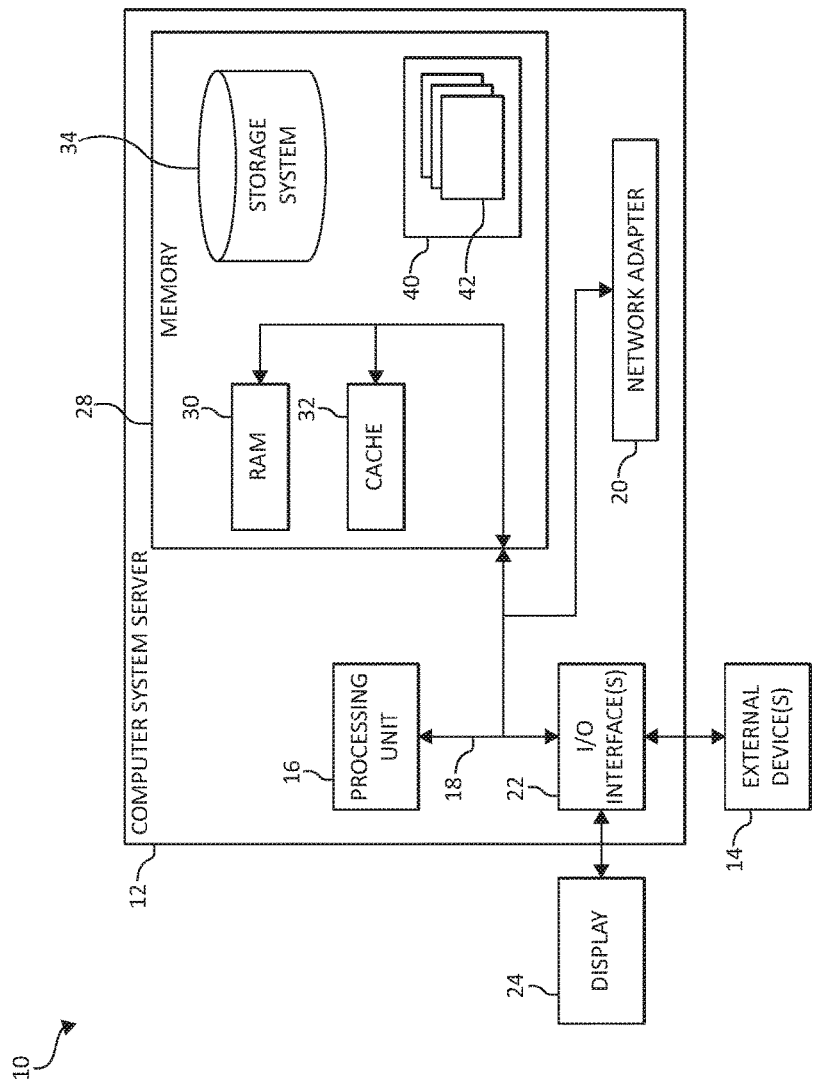
FIG. 1 is a block diagram depicting an exemplary computing node according to an embodiment of the present invention.

As previously indicated, as 3D printing becomes more common, there is a need to provide the user with real-time updates of the current status of the printed object, as well as to give the user the ability to check for quality control issues and make any appropriate corrections when desired.

For example, consider a scenario in which a defect, such as a crack, is formed within the object during the printing process. In such an event, ideally the user would be provided with some sort of indication and be given the opportunity to, if possible, adjust the printing process to correct for, or otherwise repair, the defect before the printing process is completed.

Additionally, even if no defects are formed, the user may decide to make changes to the final product during the printing process. Ideally, the user would be provided with a simple and intuitive manner to inspect the portion(s) of the object that have already been formed and alter or adjust the printing process to make changes before the printing process is completed.

In view of the foregoing, a need exists for 3D printing methods and systems, or methods and systems for verifying and modifying 3D printing processes, that provide the user with real-time information regarding the current state of the printed object as well as the ability to make changes to the process before it's completed.

To address these needs, the methods and systems of the present invention use, for example, sensors to scan (or monitor) the 3D printing process and generate a holographic object (or image) that is displayed to the user to provide the user with an indication of the current state of the 3D printing process. In one example, the user may interact with the holographic object and/or the device creating the holographic object to, for example, make adjustments to the 3D printing process.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a 3D printing device (or 3D printer). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
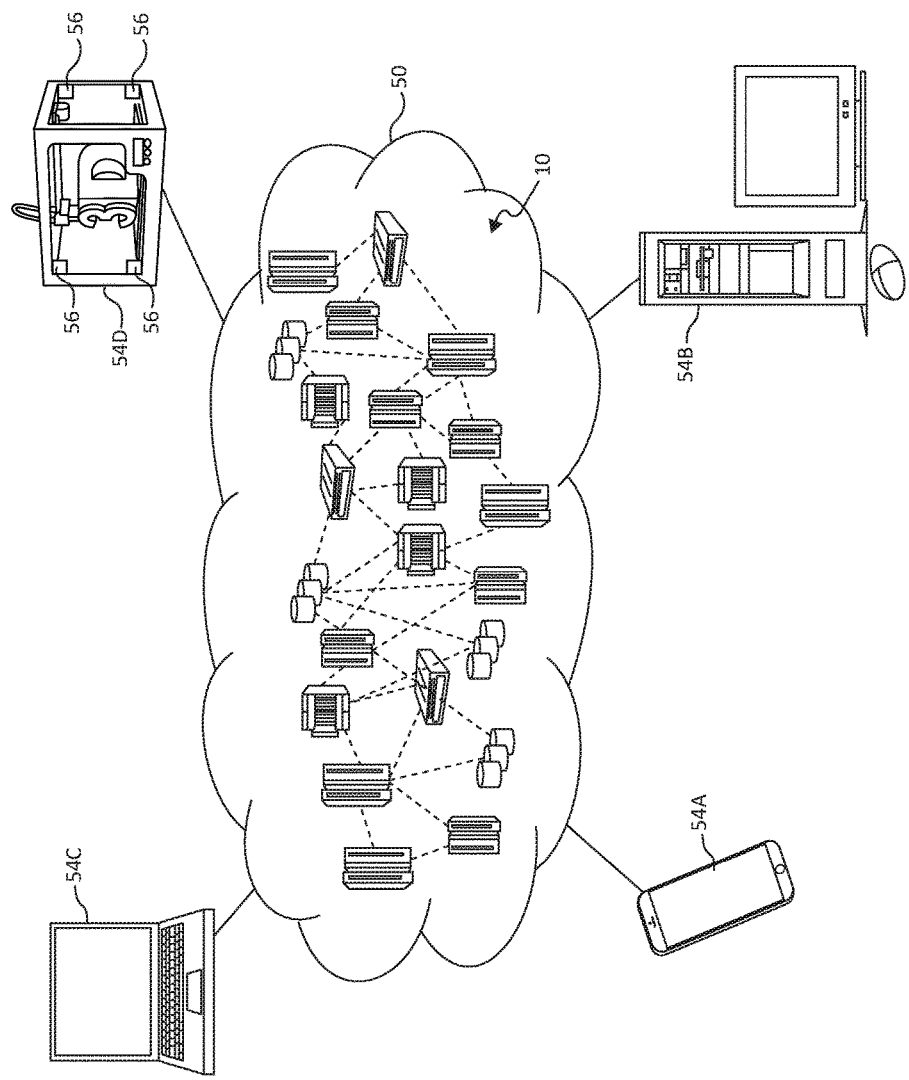
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA), cellular telephone, or tablet 54A, desktop computer 54B, and/or laptop computer 54C, as well as 3D printer 54D, may communicate. In one example, sensors 56 are coupled to 3D printer 54D (and/or a computing system within 3D printer and/or the other computing devices within cloud computing environment 50). For example, the sensors 56 may be installed on an interior of the 3D printer in such a manner to scan the object being created during the 3D printing process and/or otherwise monitor the 3D printing process. The sensors 56 may be, for example, ultrasonic modules, cameras (e.g., visible light cameras), infrared sensors (or cameras), X-ray sensors (or cameras), or any other type of sensor/device suitable for monitoring the 3D printing process.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
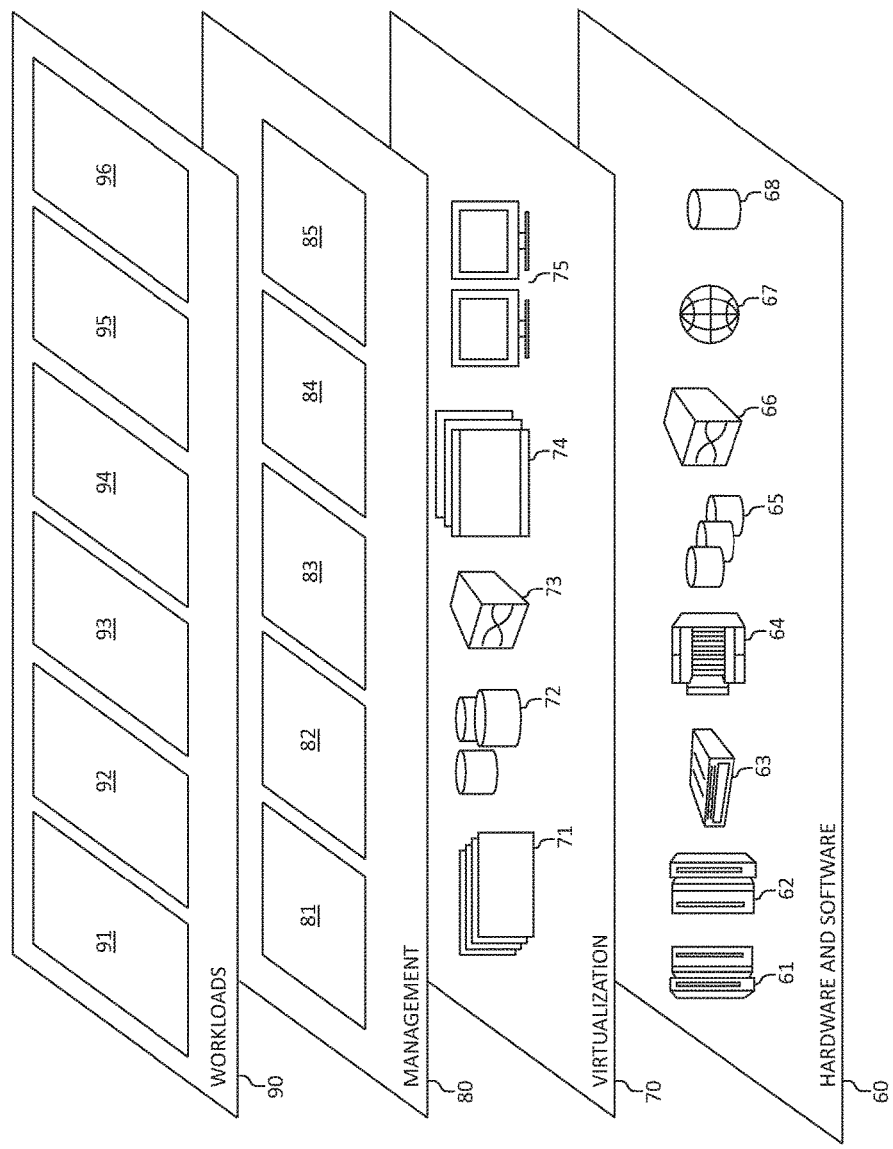
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various object scanning and holographic image/object projection workloads and functions 96 for scanning a 3D printed object (e.g., a partially completed 3D printed object) using, for example, sensors 56 coupled to 3D printer 54D and a computing device, such as PDA, cellular telephone, or tablet 54A. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for 3D printing an object, or more specifically, for verifying and modifying 3D printing processes, that provide the user with real-time information regarding the current state of the printed object as well as the ability to make changes to the process before it's completed. In one example, during a 3D printing process to form a 3D printed objected, a partially completed 3D printed object formed by the 3D printing process is scanned. A shape of the partially completed 3D printed object is determined based on scanning of the partially completed 3D printed object. A holographic object is caused to be generated based on the determined shape of the partially completed 3D printed object.

In one example, the scanning of the partially completed 3D printed object is performed with sensors (e.g., ultrasonic modules and/or cameras) coupled to the 3D printer (e.g., sensors housed with the 3D printer). The scanning may be performed repeatedly and/or continuously during the 3D printing process, and the generated holographic object (or image) may likewise be repeatedly and/or continuously updated to reflect the current state (i.e., size, shape, structural characteristics, etc.) of the 3D printed object.

In one example, the holographic object is generated by a computing device, such as a PDA, cellular telephone, tablet, or other device known in the art, capable of generating a hologram. In addition to generating the holographic object, the computing device may be able to detect the presence of a user input device (e.g., a user's finger or a stylus) in, on, or near the holographic object such that the user may interact with the holographic object. For example, the presence of a user's finger close enough to the holographic object to be considered "touching" it may allow the user to adjust the manner (e.g., angular orientation, size, etc.) in which the holographic object is displayed by the computing device, as well as make changes to the 3D printing process itself to alter the eventual size, shape, etc. of the 3D printed object after the completion of the 3D printing process.

In one example, the scanning of the partially completed 3D printed object may detect a structural defect (e.g., a crack) in the deposited material. The structural defect may be shown on the holographic object to provide the user with an indication that the partially completed 3D printed object has not been ideally formed. As one example, the structural defect may be displayed in a manner to attract the attention of the user (e.g., a different color, intensity, etc. compared to the other portions of the partially completed 3D printed object). The computing device may alert the user of the structural defect in other ways, such as by providing a message on the screen of the computing device. When the user is alerted to the structural defect, the user may make changes to the 3D printing process (e.g., using a finger) to correct for the structural defect, if possible, or perhaps simply to change the shape of the 3D printed object as it will appear after the completion of the 3D printing process (e.g., the user input may alter the digital file being used for the 3D printing process).

In one example, the holographic object includes a first portion and a second portion. The first portion may correspond to (or represent) the partially completed 3D printed object. The second portion may correspond to the remaining portion(s) of the 3D printed object that have yet to be formed and may be displayed in a manner different than the first portion. For example, the second portion of the holographic object may be displayed in a different color or intensity than the first portion so that the user may readily differentiate the second, uncompleted portion from the first portion. In this manner, the user may be provided with a single holographic object in which both the first and second portions combined represent what the appearance of the 3D printed object will be after the 3D printing process is completed.

In one example, multiple holographic objects are simultaneously generated. A first of the holographic objects may correspond to the partially completed 3D printed object, while a second of the holographic objects may correspond to the 3D printed object after the completion of the 3D printing process. The second holographic object may be generated simultaneously with the first holographic object. In this manner, the user may be simultaneously provided with the current state of the partially completed 3D object and with what the appearance of the 3D printed object will be after the 3D printing process is completed, with separate holographic objects.

Figure 4:
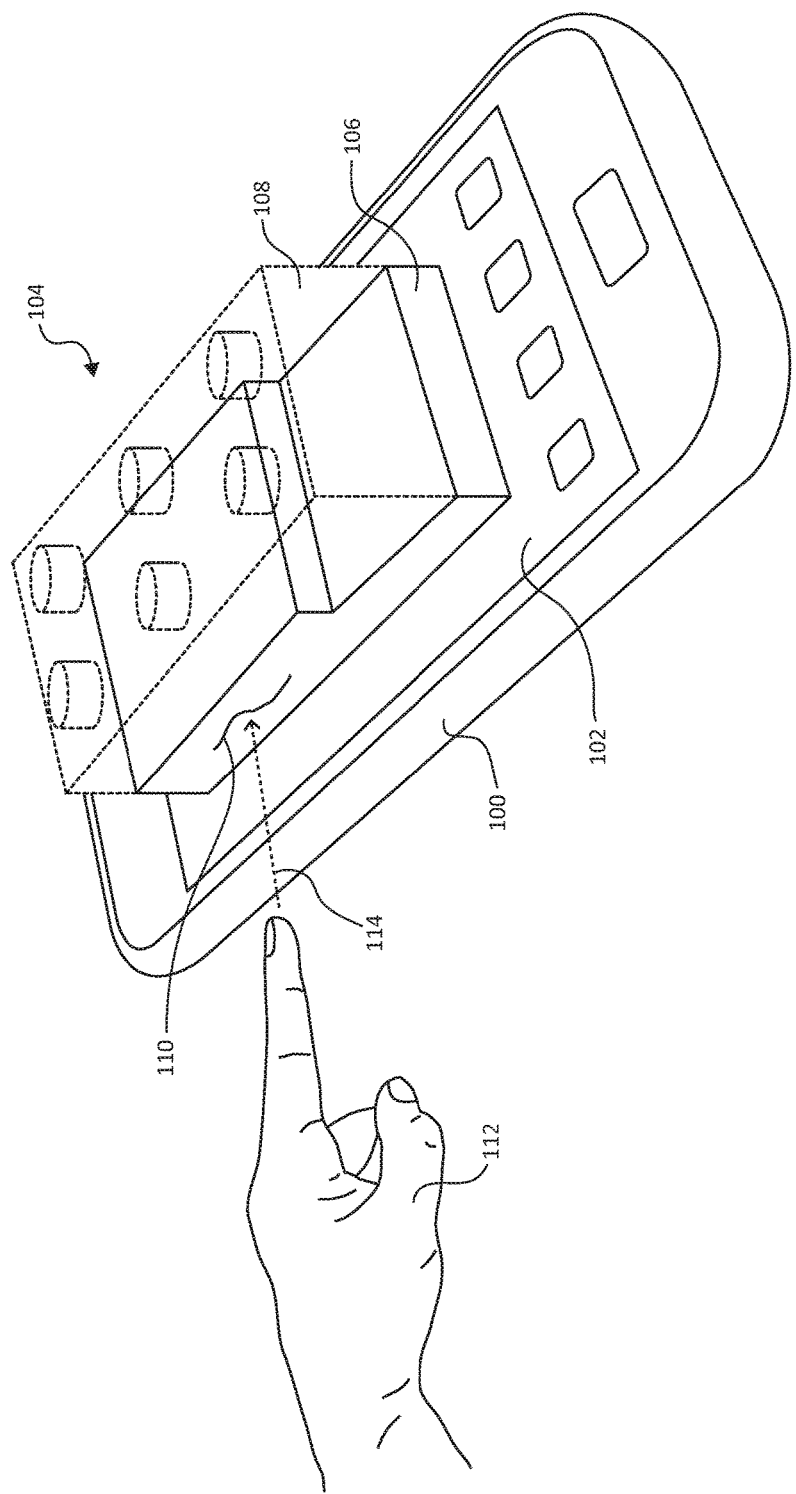
FIG. 4 is a perspective view of a computing device generating a holographic object in accordance with aspects of the present invention.

Referring to FIG. 4, a computing device 100 is shown. In the illustrated example, the computing device 100 is a cellular telephone. However, it should be understood that the computing device 100 may be any computing device suited to generating 3D holographic objects (or images), as will be appreciated by one skilled in the art, such as, for example, PDAs and tablets. Still referring to FIG. 4, the computing device 100 includes a screen 102 that, as the computing device 100 is oriented in FIG. 4, is facing upwards.

A holographic object 104 is shown as being generated (or displayed) in the three-dimensional space (or air) directly above the screen 102. It should be noted that in FIG. 4, as well as the similar figures described below, the holographic object 104 is shown as a "solid" object (i.e., the portions of the computing device 100 "behind" the holographic object 104 are not visible). However, the holographic object 104 is illustrated in this manner simply for purposes of visual clarity. In some embodiments, the holographic object 104 is at least somewhat transparent, such that the user is able to see "through" it, at least to some degree.

As described above, the holographic object 104 may be generated based on data obtained by sensors coupled to a 3D printer while scanning the object being printed. In the depicted embodiment, the holographic image 104 includes a first portion 106 and a second portion 108. The first portion 106 of the holographic object 104 may correspond to the current state (i.e., size, shape, etc.) of the 3D printed object currently being formed by the 3D printing process (i.e., the first portion 106 may be generated based on data collected during the scanning within the 3D printer). The second portion 108 of the holographic object 104 may correspond to the portion(s) of the 3D printed object that have not yet been formed or deposited (i.e., the second portion 108 may be generated based on the digital file being used for the 3D printing process, perhaps in combination with the data collected by the sensors, and correspond to a predicted size, shape, etc. of the remaining portions of the 3D printed object). Although the example shown in FIG. 4 indicates both the first portion 106 of the holographic object 104 and the second portion 108 of the holographic object 104 being simultaneously displayed, it should be understood that in some examples, only one of the portions may be shown (e.g., the user may choose which of the portions to be displayed.

In one example, the first portion 106 of the holographic object 104 is displayed in a manner different than that of the second portion 108, as indicated in FIG. 4 by the first portion 106 of the holographic object 104 being shown in solid lines, while the second portion 108 is shown in dashed lines. For example, the first portion 106 may be displayed in a color and/or with an intensity (i.e., brightness) that is different than that of the second portion 108.

Although not specifically shown, the holographic object 104 may be repeatedly (and/or continuously) updated in real-time to reflect the progress of the 3D printing process. As such, as the 3D printing process continues, the first portion 106 of the holographic object 104 may increase in size (e.g., layer by layer), while the second portion 108 decreases in size.

Still referring to FIG. 4, within the first portion 106 of the holographic object 104, a structural defect (e.g., a crack) 110 is shown. The structural defect 110 may correspond to an imperfection that has occurred in the 3D printing process, manifested itself in the material that has already been deposited, and has been detected by the sensors scanning the partially completed 3D printed object. Although not clearly shown, the structural defect 110 may be displayed in a manner (e.g., with respect to color, intensity, etc.) than the remainder of the first portion 106 of the holographic object 104, thus allowing the user to easily notice it.

In one example, the user may user a user input device, such his or her hand (or finger) 112 to interact with the holographic object 104, in this case, to indicate that he or she would like to correct the structural defect 110 (if possible). For example, the user may "touch" the portion of the holographic object 104 with hand 112 (as indicated by arrow 114) where the structural defect 110 is displayed to indicate that such a correct is desired. After indicating such, the user may be provided with a message asking the user to verify that he or she would like to adjust the 3D printing process to correct for the defect 110 (again, if possible). Although not shown, in situations in which it is possible to correct for the structural defect 110, as the defect 110 is eliminated, the manner in which the holographic object 104 is displayed may change as the 3D printing process makes the correction (e.g., the structural defect 110 may disappear in real-time as the 3D printing process make the suitable correction).

Figure 5:
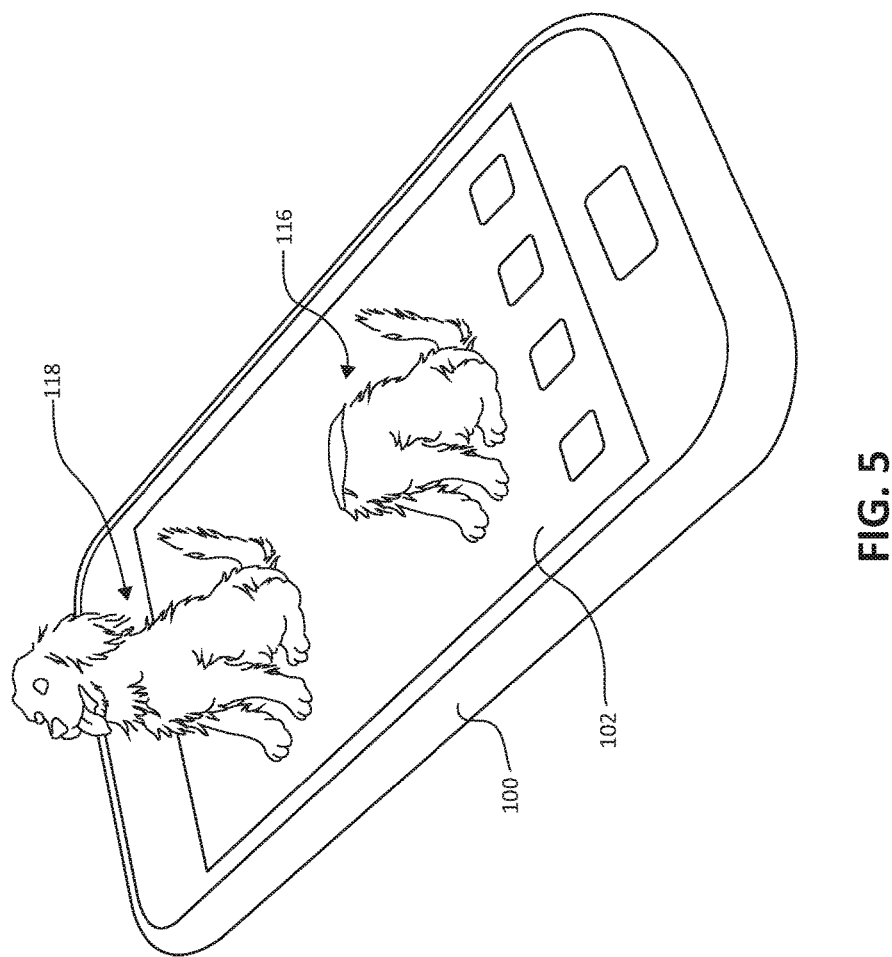
FIG. 5 is a perspective view of a computing device generating multiple holographic objects in accordance with aspects of the present invention.

Referring now to FIG. 5, the computing device 100 is shown as generating multiple holographic objects on (or above) the screen 102. In particular, the holographic objects include a first holographic object 116 and a second holographic object 118. In the depicted embodiment, the first holographic object 116 corresponds to the current state of the partially completed 3D printed object as determined by the data retrieved from the most recent scan performed by the sensors monitoring the 3D printing process. In this way, the first holographic object 116 in FIG. 5 may be similar to the first portion 106 of the holographic object 104 shown in FIG. 4, and may similarly be updated in real-time as the 3D printing process progresses, which may include incorporating changes made to the process by the user, as described above. Still referring to FIG. 4, the second holographic object 118 may correspond to the predicted appearance of the 3D printed object after the completion of the 3D printing process (i.e., the second holographic object 118 may be generated based on the digital file being used for the 3D printing process, perhaps in combination with the data collected by the sensors). In one example, the first holographic object 116 and the second holographic object 118 are displayed in a different manner (e.g., with respect to color, intensity, etc.).

Figure 6:
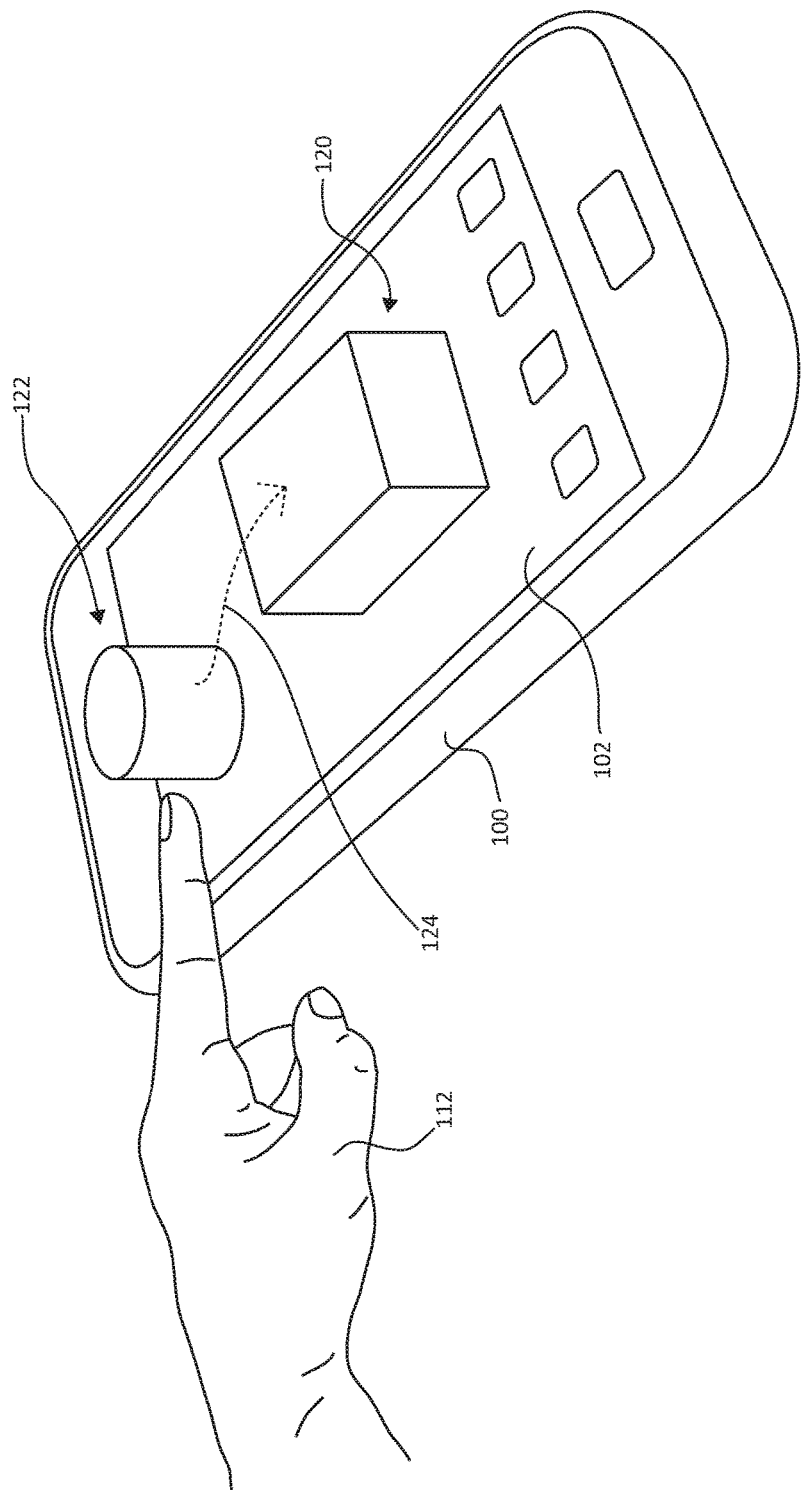
FIG. 6 is a perspective view of a computing device generating multiple holographic objects in accordance with aspects of the present invention.

Referring to FIG. 6, the computing device 100 is again shown as generating multiple holographic objects on (or above) the screen 102. As before, the holographic objects include a first holographic object 120 and a second holographic object 122, and again, the first holographic object 120 may correspond to the current state of the partially completed 3D printed object as determined by the data retrieved from the most recent scan from the sensors monitoring the 3D printing process. It should be noted that in some embodiments the first holographic object 120 corresponds to a completed (portion of) 3D printed object, as indicated by the current digital file being used by the 3D printing process.

In one example, the second holographic object 122 corresponds to a change (e.g., an addition) that may be made to the 3D printed object. In particular, the user may use, for example, his or her hand 112 (or another user input device) to "add" the shape indicated by the second holographic object 122 to the first holographic object 120. For example, the user may select the second holographic object 122 with his or her hand 112 and "drag" it to a position on top of the first holographic object 120, as indicated by arrow 124 in FIG. 6.

Figure 7:
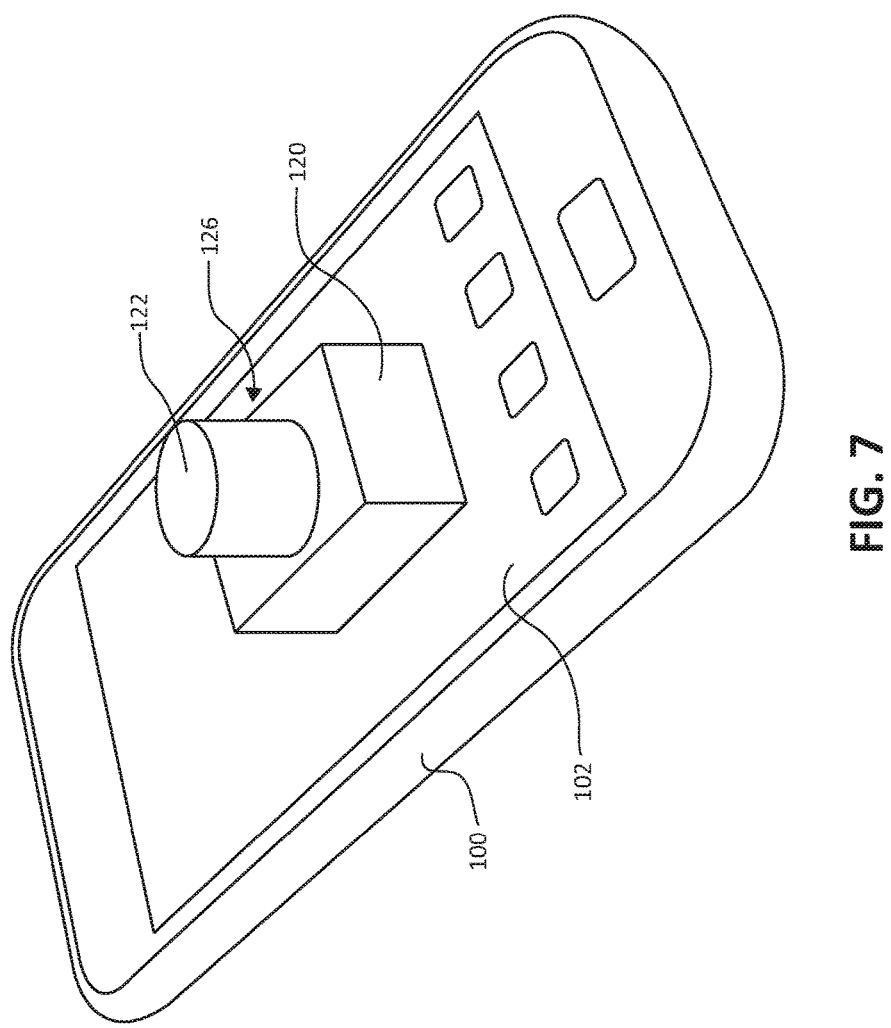
FIG. 7 is a perspective view of the computing device of FIG. 6 after the multiple holographic objects have been combined in accordance with aspects of the present invention.

FIG. 7 illustrates the first holographic object 120 and the second holographic object 122 of FIG. 6 after the second holographic object 122 has been positioned on top of the first holographic object 120, resulting in a composite (or combined) holographic object 126. In response, the digital file being used by the 3D printing process may be updated so that the 3D printing process resumes depositing material so that the final 3D printed object will reflect the composite holographic object 126 (i.e., the first holographic object 120 combined with the second holographic object 122).

Figure 8:
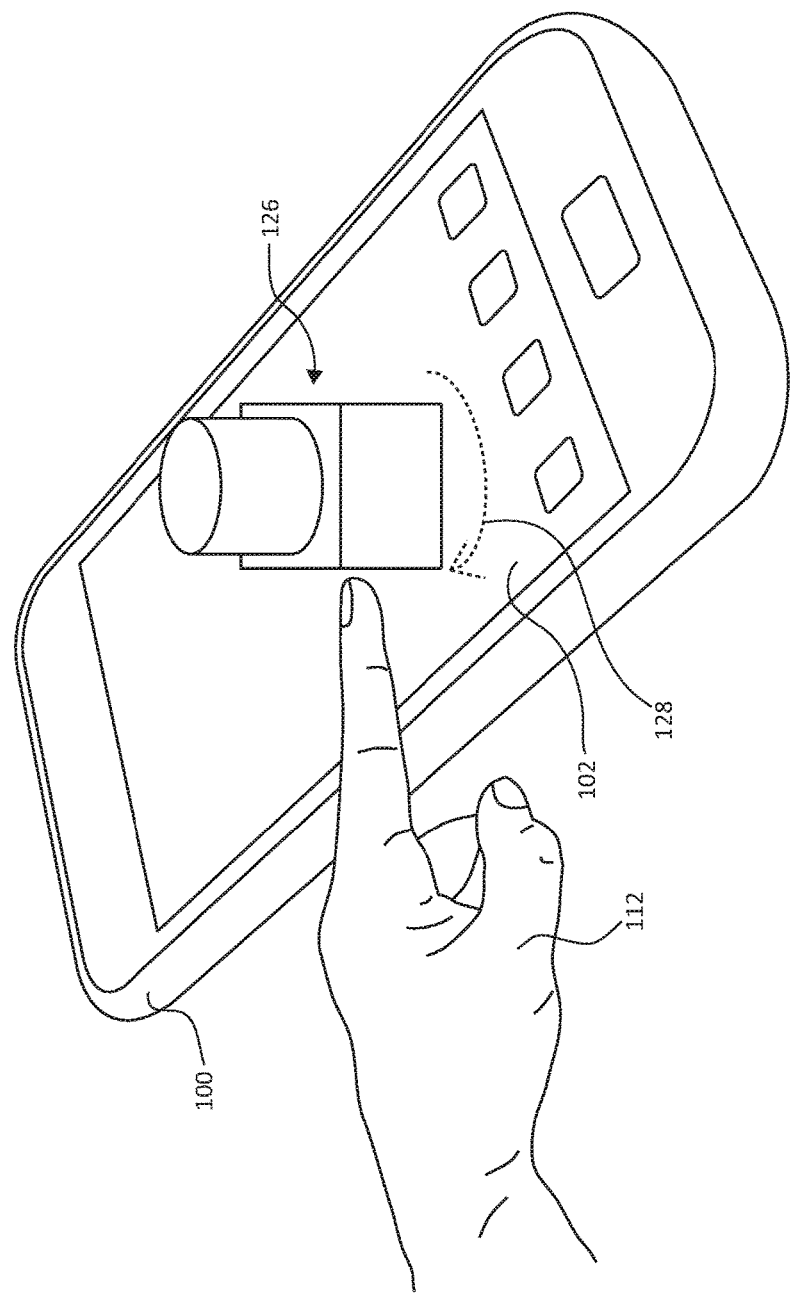
FIG. 8 is a perspective view of the computing device of FIG. 7 illustrating the combined holographic object being manipulated by a user in accordance with aspects of the present invention.

Referring to FIG. 8, which still shows the composite holographic object 126 simply as an example, the user may alter the manner in which the object 126 is displayed by interacting with the object 126 using, for example, his or her hand 112. For example, the user may "touch" a portion of the holographic object 126 and "drag" that portion in an intuitive manner, resulting in, for example, the holographic object 126 being rotated, as indicated by arrow 128. Although not shown, it should be understood that other various gestures may be used to, for example, change the position of the holographic object 126 above the screen 102, rotate the holographic object 126 about axes different than that shown in FIG. 8, change the displayed size of the holographic object 126 (i.e., "zoom in" and/or "zoom out"), etc.

Further, in one example, the user is provided (e.g., by the computing device 100) with a selection of "tools" that may be assigned to the user input device 112 (e.g., their hand or finger). In this manner, the user may select how their interaction with the holographic object(s) affects the holographic object(s) and/or the 3D printing process. For example, instead of simply altering the manner in which the holographic object(s) is displayed, the user may select to have their interaction affect the 3D printing process, such to correct for structural defects and/or otherwise change the size/shape of the 3D printed object, as described above. It should be noted that the changes made to the 3D printing process may be applied to the portion(s) of the 3D printed object which have already been formed (i.e., the partially complete 3D printed object) and/or the portions of the 3D printed object which have not yet been formed. For example, in embodiments in which a single holographic object is displayed in two portions (e.g., as in FIG. 4), the user may make changes to either the first portion 106 of the holographic object 104 and/or the second portion of the holographic object 104. It should also be noted that in some embodiments, when the user is detected as making changes to the 3D printing process, the 3D printing process may be temporarily stopped until, for example, the user has completed his or her changes and/or the digital file has been appropriately altered.

Figure 9:
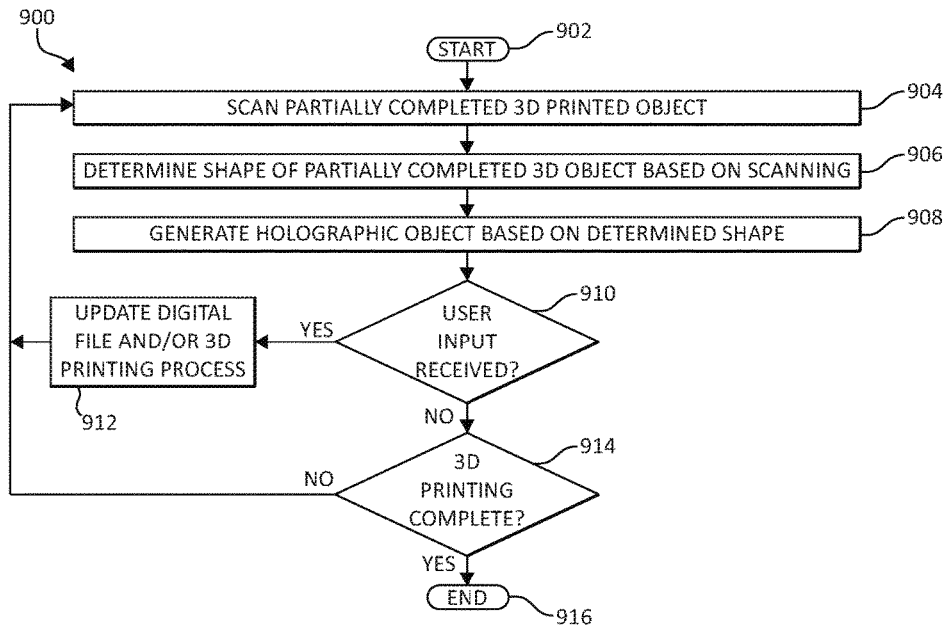
FIG. 9 is a flowchart diagram depicting an exemplary method for 3D printing an object, or more particularly, for verifying and modifying a 3D printing process in which various aspects of the present invention may be implemented.

Turning to FIG. 9, a flowchart diagram of an exemplary method 900 for 3D printing an objet, or more particularly for verifying and modifying a 3D printing process, is illustrated. Method 900 begins (step 902) with the initiation of a 3D printing process. During the 3D printing process (e.g., before the completion of the 3D printing process), the partially completed 3D printed object is scanned (step 904). As described above, the scanning may be performed with sensors, such as ultrasonic modules and/or cameras, coupled to (e.g., housed within) the 3D printer. Based on the scanning of the partially completed 3D printed object (i.e., the data collected during the scanning), a shape (and/or size and/or structural integrity) of the partially completed 3D printed object is determined (step 906). A holographic object is then generated (or caused to be generated) based on the determined shape of the partially completed 3D printed object (step 908). As described above, the holographic object may be generated by, for example, a computing device, such as a PDA, cellular telephone, or tablet.

Next, if user input is received (step 910) that is indicative of a desired change to the 3D printing process, the digital file being used for the 3D printing process and/or the printing process as a whole is changed based on the user input and/or the changes to the 3D printing process indicated by the user input (step 912). As described above, in one example, the user input may be provided by the user interacting with the generated holographic object. After the digital file and/or printing process is updated, the partially completed 3D printed object is again scanned (step 904) and method 900 again proceeds as described above.

If no user input is received (step 910), it is then determined whether or not the 3D printing process has been completed (step 914). If the 3D printing process is not completed, the partially completed 3D printed object is again scanned (step 904) and method 900 again proceeds as described above (i.e., such that the generated holographic object is representative of the current state of the 3D printed object). If the 3D printing process is completed, method 900 ends (step 916).

Figure 10:
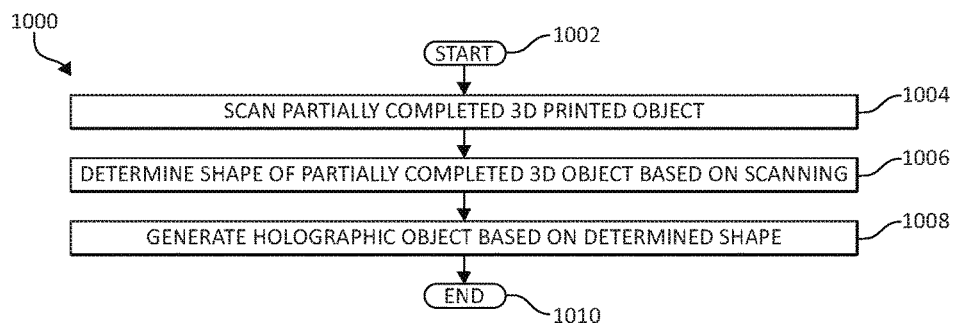
FIG. 10 is a flowchart diagram depicting an exemplary method for 3D printing an object, or more particularly, for verifying and modifying a 3D printing process, again in which various aspects of the present invention may be implemented.

It should be understood that in some embodiments the methods for 3D printing an object, or more particularly for verifying and modifying a 3D printing process, described herein may not include all of the steps depicted in FIG. 9. As such, referring to FIG. 10, a flowchart diagram of an exemplary method 1000, having fewer steps than is depicted in FIG. 9, for 3D printing an objet, or more particularly for verifying and modifying a 3D printing process, in accordance with various aspects of the present invention, is illustrated. Method 1000 begins (step 1002) with the initiation of a 3D printing process. During the 3D printing process (e.g., before the completion of the 3D printing process), the partially completed 3D printed object is scanned (step 1004). As described above, the scanning may be performed with sensors, such as ultrasonic modules and/or cameras, coupled to (e.g., housed within) the 3D printer. Based on the scanning of the partially completed 3D printed object (i.e., the data collected during the scanning), a shape (and/or size and/or structural integrity) of the partially completed 3D printed object is determined (step 1006). A holographic object is then generated (or caused to be generated) based on the determined shape of the partially completed 3D printed object (step 1008). As described above, the holographic object may be generated by, for example, a computing device, such as a PDA, cellular telephone, or tablet. Method ends with, for example, the completion of the 3D printing process (step 1010). However, as described above, method 100 may return (perhaps repeatedly) to the scanning of the partially completed 3D printed object (step 1004) and again proceed as described above such that the generated holographic object is representative of the current state of the 3D printed object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for 3D printing an object, comprising:
 during a 3D printing process to form a 3D printed object, scanning a partially completed 3D printed object formed by the 3D printing process;
 determining a shape of the partially completed 3D printed object based on scanning of the partially completed 3D printed object; and
 causing a holographic object to be generated on a computing device based on the determined shape of the partially completed 3D printed object; wherein the holographic object is manipulated on the computing device in response to detecting a user input device interacting with the holographic object commensurate with the generating; and wherein manipulating the holographic object further includes changing the shape of the partially completed 3D printed object such that, at a conclusion of the 3D printing process, the 3D printed object is altered from an original input form.

2. The method of claim 1, wherein the scanning of the partially completed 3D printed object is performed by at least one sensor coupled to a 3D printer performing the 3D printing process.

3. The method of claim 2, wherein the at least one sensor comprises an ultrasonic module, a camera, an X-ray sensor, or an infrared sensor.

4. The method of claim 1, wherein the scanning of the partially completed 3D printed object and the determining of the shape of the partially completed 3D printed object are repeated during the 3D printing process.

5. The method of claim 1, wherein the holographic object includes a first portion based on the determined shape of the partially completed 3D printed object and a second portion based on a predicted shape of the 3D printed object after the completion of the 3D printing process, and wherein the second portion of the holographic object is generated in a manner different than that of the first portion of the holographic object.

6. The method of claim 1, further including causing a second holographic object to be generated based on a predicted shape of the 3D printed object after the completion of the 3D printing process.

7. The method of claim 6, wherein the causing of the second holographic object to be generated occurs simultaneously with the causing of the holographic object to be generated.

8. A system for 3D printing an object, comprising:
a processor that
during a 3D printing process to form a 3D printed object, scans a partially completed 3D printed object formed by the 3D printing process;
determines a shape of the partially completed 3D printed object based on scanning of the partially completed 3D printed object; and
causes a holographic object to be generated on a computing device based on the determined shape of the partially completed 3D printed object; wherein the holographic object is manipulated on the computing device in response to detecting a user input device interacting with the holographic object commensurate with the generating; and wherein manipulating the holographic object further includes changing the shape of the partially completed 3D printed object such that, at a conclusion of the 3D printing process, the 3D printed object is altered from an original input form.

9. The system of claim 8, wherein the processor scans the partially completed 3D printed object using at least one sensor coupled to a 3D printer performing the 3D printing process.

10. The system of claim 9, wherein the at least one sensor comprises an ultrasonic module, a camera, an X-ray sensor, or an infrared sensor.

11. The system of claim 8, wherein the processor repeatedly scans the partially completed 3D printed object and repeatedly determines the shape of the partially completed 3D printed object during the 3D printing process.

12. The system of claim 8, wherein the processor causes the holographic object to be generated such that the holographic object includes a first portion based on the determined shape of the partially completed 3D printed object and a second portion based on a predicted shape of the 3D printed object after the completion of the 3D printing process, and wherein the processing causes the second portion of the holographic object to be generated in a manner different than that of the first portion of the holographic object.

13. The system of claim 8, wherein the processor causes a second holographic object to be generated based on a predicted shape of the 3D printed object after the completion of the 3D printing process.

14. The system of claim 13, wherein the processor causes second holographic object to be generated simultaneously with the holographic object.

15. A computer program product for 3D printing an object by a processor, the computer program product comprising a non-transitory computer-readable storage medium having computer-readable program code portions stored therein, the computer-readable program code portions comprising:
an executable portion that
during a 3D printing process to form a 3D printed object, scans a partially completed 3D printed object formed by the 3D printing process;
determines a shape of the partially completed 3D printed object based on scanning of the partially completed 3D printed object; and
causes a holographic object to be generated on a computing device based on the determined shape of the partially completed 3D printed object; wherein the holographic object is manipulated on the computing device in response to detecting a user input device interacting with the holographic object commensurate with the generating; and wherein manipulating the holographic object further includes changing the shape of the partially completed 3D printed object such that, at a conclusion of the 3D printing process, the 3D printed object is altered from an original input form.

16. The computer program product of claim 15, wherein the scanning of the partially completed 3D printed object is performed by at least one sensor coupled to a 3D printer performing the 3D printing process.

17. The computer program product of claim 16, wherein the at least one sensor comprises an ultrasonic module, a camera, an X-ray sensor, or an infrared sensor.

18. The computer program product of claim 15, wherein the scanning of the partially completed 3D printed object and the determining of the shape of the partially completed 3D printed object are repeated during the 3D printing process.

19. The computer program product of claim 15, wherein the holographic object includes a first portion based on the determined shape of the partially completed 3D printed object and a second portion based on a predicted shape of the 3D printed object after the completion of the 3D printing process, and wherein the executable portion causes the second portion of the holographic object to be generated in a manner different than that of the first portion of the holographic object.

20. The computer program product of claim 15, further including an executable portion that causes a second holographic object to be generated based on a predicted shape of the 3D printed object after the completion of the 3D printing process.

21. The computer program product of claim 20, wherein the executable portion causes the second holographic object to be generated simultaneously with the holographic object.

* * * * *